(12) United States Patent
Gatton, Jr. et al.

(10) Patent No.: US 8,192,529 B2
(45) Date of Patent: Jun. 5, 2012

(54) INTEGRATED DRY SCRUBBER SYSTEM

(76) Inventors: Lawrence H. Gatton, Jr., Knoxville, TN (US); Alan W. Ferguson, Knoxville, TN (US); Per H. F. Landmer, Vaxjo (SE)

(*) Notice: Subject to any disclaimer, the term of this patent is extended or adjusted under 35 U.S.C. 154(b) by 274 days.

(21) Appl. No.: 12/703,324

(22) Filed: Feb. 10, 2010

(65) Prior Publication Data
US 2010/0233055 A1 Sep. 16, 2010

Related U.S. Application Data

(60) Provisional application No. 61/158,799, filed on Mar. 10, 2009.

(51) Int. Cl.
*B01D 53/02* (2006.01)
(52) U.S. Cl. ............ 95/137; 95/135; 96/134; 422/169; 423/215.5; 423/244.07
(58) Field of Classification Search .............. 95/135, 95/137; 423/215.5, 244.07; 422/169; 96/134
See application file for complete search history.

(56) References Cited

U.S. PATENT DOCUMENTS

| | | | | |
|---|---|---|---|---|
| 3,712,029 | A * | 1/1973 | Charlton | 96/3 |
| 3,917,458 | A * | 11/1975 | Polak | 422/169 |
| 4,446,109 | A * | 5/1984 | Bakke | 422/168 |
| 4,764,348 | A * | 8/1988 | Furlong | 422/178 |
| 5,076,819 | A * | 12/1991 | Sharrow | 95/151 |
| 5,215,557 | A * | 6/1993 | Johnson et al. | 96/52 |
| 5,599,508 | A * | 2/1997 | Martinelli et al. | 422/169 |
| 5,711,785 | A * | 1/1998 | Maxwell | 95/15 |
| 5,795,548 | A * | 8/1998 | Madden et al. | 422/171 |
| 6,096,114 | A * | 8/2000 | Li et al. | 95/47 |
| 6,214,089 | B1 * | 4/2001 | Li et al. | 95/45 |
| 6,267,795 | B1 * | 7/2001 | Givargis | 55/467.1 |
| 6,511,637 | B2 * | 1/2003 | Bundy | 422/171 |
| 7,141,091 | B2 | 11/2006 | Chang | |
| 7,189,074 | B2 | 3/2007 | Leung et al. | |
| 7,288,128 | B2 * | 10/2007 | Snyder | 55/418 |
| 7,678,354 | B2 * | 3/2010 | Squire et al. | 423/244.07 |
| 2009/0162269 | A1 * | 6/2009 | Barger et al. | |
| 2010/0047147 | A1 * | 2/2010 | Gatton et al. | 423/244.08 |

FOREIGN PATENT DOCUMENTS

| | | |
|---|---|---|
| DE | 19523417 | 11/1996 |
| DE | 19610199 | 9/1997 |
| DE | 19757948 | 7/1999 |
| DE | 102006038443 | 9/2007 |
| EP | 2078555 | 7/2009 |
| KR | 10-0252809 | 4/2000 |
| WO | WO 2006/080636 | 8/2006 |

OTHER PUBLICATIONS

PCT International Search Report and The Written Opinion of the International Search Authority, May 18, 2010 (PCT/US2010/024997).

* cited by examiner

*Primary Examiner* — Robert J Hill, Jr.
*Assistant Examiner* — Christopher P Jones
(74) *Attorney, Agent, or Firm* — Rita. D. Vacca

(57) ABSTRACT

An air quality control system (AQCS) (4) useful for processing a gas stream (DG), such as a flue gas stream emitted from a fossil fuel fired boiler (2), combustion process or the like, for at least partial removal of acidic and like contaminants. The air quality control system (4) includes a plurality of integrated components (12) equipped with both a dry scrubber system (8) and a fabric filter (10). The air quality control system (4) such as described possesses increased "turn down" capabilities thus increasing the efficiency thereof.

17 Claims, 3 Drawing Sheets

INTEGRATED DRY SCRUBBER SYSTEM

CLAIM OF PRIORITY

This application claims benefit under 35 U.S.C. §119(e) of co-pending U.S. Provisional Application Ser. No. 61/158,799, filed on Mar. 10, 2009, the contents of which is incorporated herein in its entirety by reference.

BACKGROUND OF THE INVENTION

1. Field of the Invention

The present invention is generally directed to an air quality control system (AQCS) useful for processing a gas stream, such as a flue gas stream emitted from a fossil fuel fired boiler, a combustion process or the like. More particularly, the present invention is directed to an integrated fabric filter module and dry scrubber system for an AQCS with increased "turn down" capabilities useful for processing a gas stream.

2. Description of the Related Art

In the treatment of flue gases or gas streams, fabric filters and dry scrubber systems are known. For example, U.S. Pat. No. 7,189,074 invented by Ching Chiu Leung et al., describes a method and process for co-combustion in a waste to energy cement production facility. The described co-combustion process involves:
1. Cement Process System;
2. Waste Reception/Handling System;
3. Waste Co-combustion System;
4. Dry Scrubbing System;
5. Power Generation System;
6. Secondary Scrubbing System; and
7. Flue Gas and Ash Treatment System.

Hence, the process utilizes two scrubbing systems, the second of which includes a baghouse filtration step, i.e., passing flue gasses through bag fabric filters to collect dust/ash. It may be noted that the co-combustion process described above requires a number of systems, each of which being indicative of significant capital, maintenance and operating expenses.

Likewise, U.S. Pat. No. 7,141,091 invented by Ramsay Chang describes a method and apparatus for removing particulate and vapor phase contaminants from a gas stream. The method removes particulate and vapor phase contaminants from a gas stream by using a scrubber configured to remove an absorbable form of the vapor phase contaminant, wherein the scrubber is located downstream of and is fluidly connected to the particulate collection device. The particulate collection device may include one or more electrostatic precipitators and one or more baghouse filtration systems. It may be noted that the particulate and vapor phase contaminants removal method as described above requires a number of systems, each of which being indicative of significant capital, maintenance and operating expenses.

While there exist methods and equipment capable of removing both particulate and vapor phase contaminants from a gas stream, there remains a need for an improved method and equipment that enables increased "turn down" when in operation to reduce operation associated costs and to improve efficiency and effectiveness.

SUMMARY OF THE INVENTION

The present invention provides an integrated dry scrubber system and fabric filter module. Traditionally, flue gas dry scrubber systems and fabric filter modules are separately sized and arranged. In accordance with the present invention, dry scrubber systems and fabric filter modules are integrated together into a single integrated component. Such integrated components are combined into an arrangement that enables increased "turn down" capabilities, efficiencies and effectiveness when in operation. The benefits of such an arrangement include a smaller overall air quality control system (AQCS) foot print, decreased capital cost, increased reliability, increased operating flexibility, and increased turn down capability without the need for a gas recirculation fan.

The dry scrubber system portion of the subject integrated component is integrated into the inlet duct of the fabric filter module portion. A plurality of integrated components are then combined to form an AQCS. Dirty flue gas laden with, for example, $SO_2$, $SO_3$, HCl, HF, particulates and/or like acidic contaminants, enters the AQCS through a single inlet plenum opening and is distributed to the individual integrated components by means of a common inlet plenum. The flue gas from the common inlet plenum enters into the individual integrated components by passing through the individual dry scrubber systems located within the individual inlet ducts of each fabric filter module. As gas passes through the dry scrubber reactor portion of the dry scrubber system, hydrated recycle material and absorption material, typically lime, are dispersed within the dry scrubber reactor. The hydrated recycle/absorption material raises the relative humidity of the flue gas to an optimal level for absorption of the flue gas' acidic vapor phase contaminants by the hydrated recycle/absorption material. Simultaneously, as the hydrated recycle/absorption material reacts with the acidic gases, i.e., $SO_2$, HCl, $SO_3$ and/or HF, the reacted recycle/absorption material is dried by the flue gas to create a dry particulate byproduct. The dry particulate byproduct is then captured within the fabric filter module of the integrated component. The captured dry particulate byproduct is collected and fed to the scrubber mixer where it is combined with water and fresh hydrated absorption material (lime) before being pumped back to the dry scrubber portion of the integrated component. The "cleaned" flue gas leaves the integrated component through a common outlet plenum where it combines with cleaned flue gas leaving the other integrated components before leaving the AQCS through a single outlet plenum opening.

Like most traditional fabric filters, the present AQCS is sectioned into multiple integrated components. By having multiple integrated components, an operator may isolate one or more individual integrated components for maintenance while keeping the remaining integrated components in operation. Likewise, one or more individual integrated components may undergo "turn down" during periods of low demand/low gas flow/low contaminant output, so as to limit or avoid needless equipment wear, energy consumption and like operation associated costs. The AQCS as described herein may be operated with a turn down to approximately 10 percent of its total capacity. To the contrary, the prior art AQCS described in U.S. Pat. No. 7,141,091 may be operated with a turn down to only approximately 50 percent of its total capacity, based on its traditional system configuration. Traditionally, the dry scrubber portion of an AQCS is a separate independently configured piece of equipment up stream of the fabric filter or filter baghouse. The present integrated component comprising both a dry scrubber system and a fabric filter module, and the arrangement of multiple integrated components in an AQCS as described in greater detail below, combines a plurality of dry scrubbers and fabric filters in a particular orientation to achieve a smaller overall AQCS foot print, decreased capital cost, increased reliability, increased operating flexibility, and increased turn down capability without the need for a gas recirculation fan.

Traditional AQCSs are constructed by designing, sizing and arranging the dry scrubber systems so as to be independent and apart from the fabric filter modules. The dry scrubber systems and fabric filter modules are typically arranged and designed for positioning in a linear series. By arranging the dry scrubber systems and fabric filter modules in a linear series, it is difficult to add components to the AQCS for increased capacity or improved contaminant absorption/collection due to space limitations. Likewise, AQCS issues such as reliability, maintainability, and turn down are approached and addressed as independent considerations.

In general, the maintainability/reliability of AQCSs with integrated components are superior to those having dry scrubber systems in a linear series due to the compartmentalization capabilities of the AQCSs' integrated components. A single fabric filter module, may have as few as 4 or as many as 16 or more individual fabric filter compartments. Such compartmentalization within fabric filter modules allows individual fabric filter compartments to be isolated for maintenance while the remaining fabric filter compartments may still be in active service. Accordingly, fabric filter modules have superior maintainability/reliability. Such is likewise true for the subject AQCSs.

To the contrary, dry scrubber systems are typically sized larger to reduce overall cost at the expense of maintainability, reliability and turn down capabilities. Also, in the traditional AQCS linear series arrangement, increasing the number of parallel dry scrubber systems significantly increases the amount of necessary ductwork and the number of large isolation dampers required, resulting in a much larger footprint for the overall AQCS system. By having fewer, larger dry scrubber systems, the turn down capability of AQCSs that utilize high recirculation of the solid byproduct generated through the dry scrubber reaction process is significantly decreased. Another consideration when working with dry scrubber systems is that stringent flue gas velocity requirements are necessary in order to maintain solids entrainment in the dry scrubber reactors. Accordingly, during periods of low operating loads/low flue gas generation/low contaminant output, large gas recirculation fans are required for each dry scrubber system to maintain solids entrainment during system turn down. Gas recirculation fans significantly increase the auxiliary power demand of the AQCS during such periods of low capacity utilization and are often associated with increased equipment corrosion and increased maintenance costs.

The present integrated component integrates both a dry scrubber system and fabric filter module into one AQCS component. In doing so, an individual fabric filter module is matched to the capacity of a single dry scrubber reaction vessel. Hence, the two functions, i.e., at least partial vapor phase contaminant removal and at least partial particulate contaminant removal, are thereby combined within a single integrated component. A plurality of such single integrated components may then be arranged much like a conventional compartmentalized fabric filter, as described in more detail below. In general, benefits of such an arrangement include substantial capital cost savings and significantly smaller overall AQCS footprint. More particularly, the amount of structural steel used to support the equipment and to fabricate the system may be reduced and isolation dampers typically measuring approximately 20 feet by 30 feet required to isolate each fabric filter module, now also serve to isolate each dry scrubber reactor vessel. Accordingly, the number of required isolation dampers is cut in half. Likewise, the necessary amount of AQCS inlet/outlet ductwork is significantly reduced as compared to that needed for multiple dry scrubber systems and multiple baghouses arranged in the traditional linear series.

As an added benefit, the present integrated components also enable relatively easy, rapid and increased AQCS turn down while maintaining adequate flue gas velocity through the operating integrated components during periods of low boiler/source output. The mobile inlet and outlet isolation dampers on individual integrated components may be correspondingly opened, i.e., non-blocking of fluid flow, or closed, i.e., blocking of fluid flow, as needed based on flue gas/contaminant loads from the boiler. Thus, the stringent gas velocity requirements in the operating dry scrubber reaction vessels are maintained. As boiler/source operating load decreases, individual integrated component inlet and outlet isolation dampers are closed to block flue gas flow and the associated dry scrubber system and fabric filter module are thus inactivated or non-operational. For example, if a boiler is operating at full capacity, all AQCS integrated components' mobile isolation dampers are in the open, non-blocking position, except for possibly one integrated component having both its inlet isolation damper and its outlet isolation damper in the closed, blocking position for purposes of maintenance. In this case, all integrated components, except for possibly the one, are active or operating. If a boiler is operating at mid-range capacity, approximately half of the integrated components have both their inlet isolation dampers and their outlet isolation dampers in the closed, blocking position and such integrated components are inactive or non-operational. If a boiler is operating at low capacity, all but only the needed integrated components, possibly only one, have both their inlet isolation dampers and their outlet isolation dampers in the closed, blocking position. In this case, only the needed integrated components, which may possibly be only one integrated component, remain active or operating. The mobile inlet and outlet isolation dampers are used in an opposite manner as boiler/source capacity increases. Hence, as boiler/source capacity increases, additional corresponding mobile inlet and outlet isolation dampers on integrated components are opened and such integrated components are then activated and operating. Through the use of individual integrated components with independently operating mobile inlet and outlet isolation dampers, the need for a gas recirculation fans is eliminated. Additionally, the present AQCS with individual integrated components has similar maintainability and reliability characteristics as the traditional fabric filters or filter baghouses, which are quite good.

Additional features of the present invention will appear from the following description from which the preferred embodiments are set forth in detail in conjunction with the accompanying drawings.

DETAILED DESCRIPTION OF THE EMBODIMENTS

Figure 1:
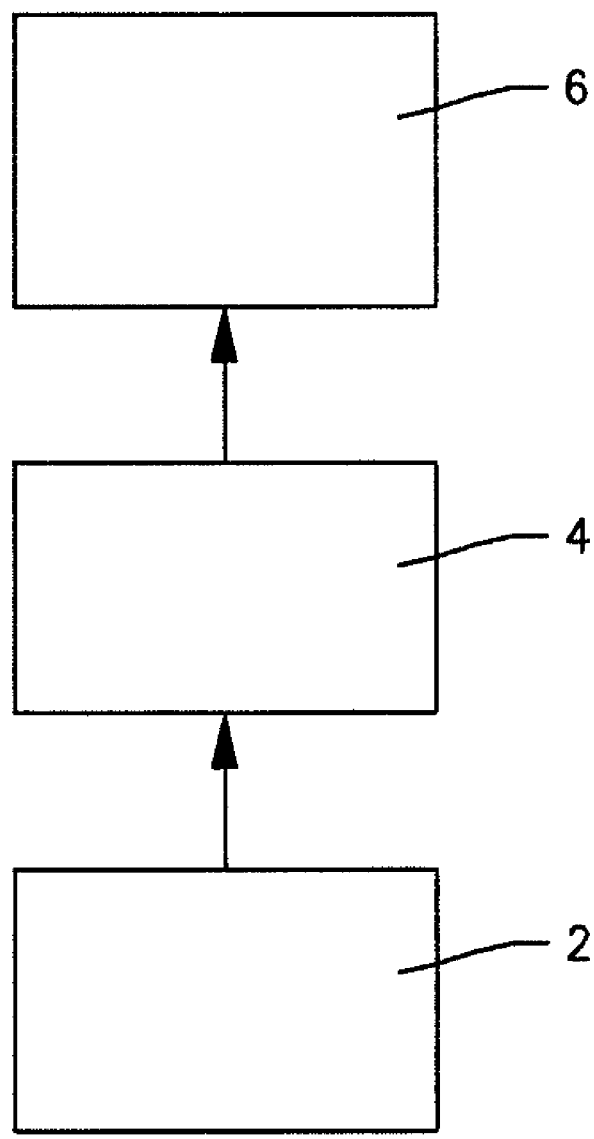
FIG. 1 is a process schematic diagram depicting one embodiment of the present invention.

One embodiment, generally depicted in FIGURE (FIG. 1 as a process schematic diagram, includes a boiler 2, an air quality control system (AQCS) 4 and an optional tower 6. It is noted that many additional and varied process steps using additional equipment may be positioned/take place between boiler 2 and AQCS 4, as is known to those skilled in the art. Likewise, many additional and varied process steps using additional equipment may be positioned/take place following AQCS 4 and prior to environmental release of a "cleaned" flue gas, CG, from optional tower 6, as is known to those skilled in the art. Such additional process steps and/or equipment are not described in further detail herein for purposes of clarity and simplicity.

Figure 2:
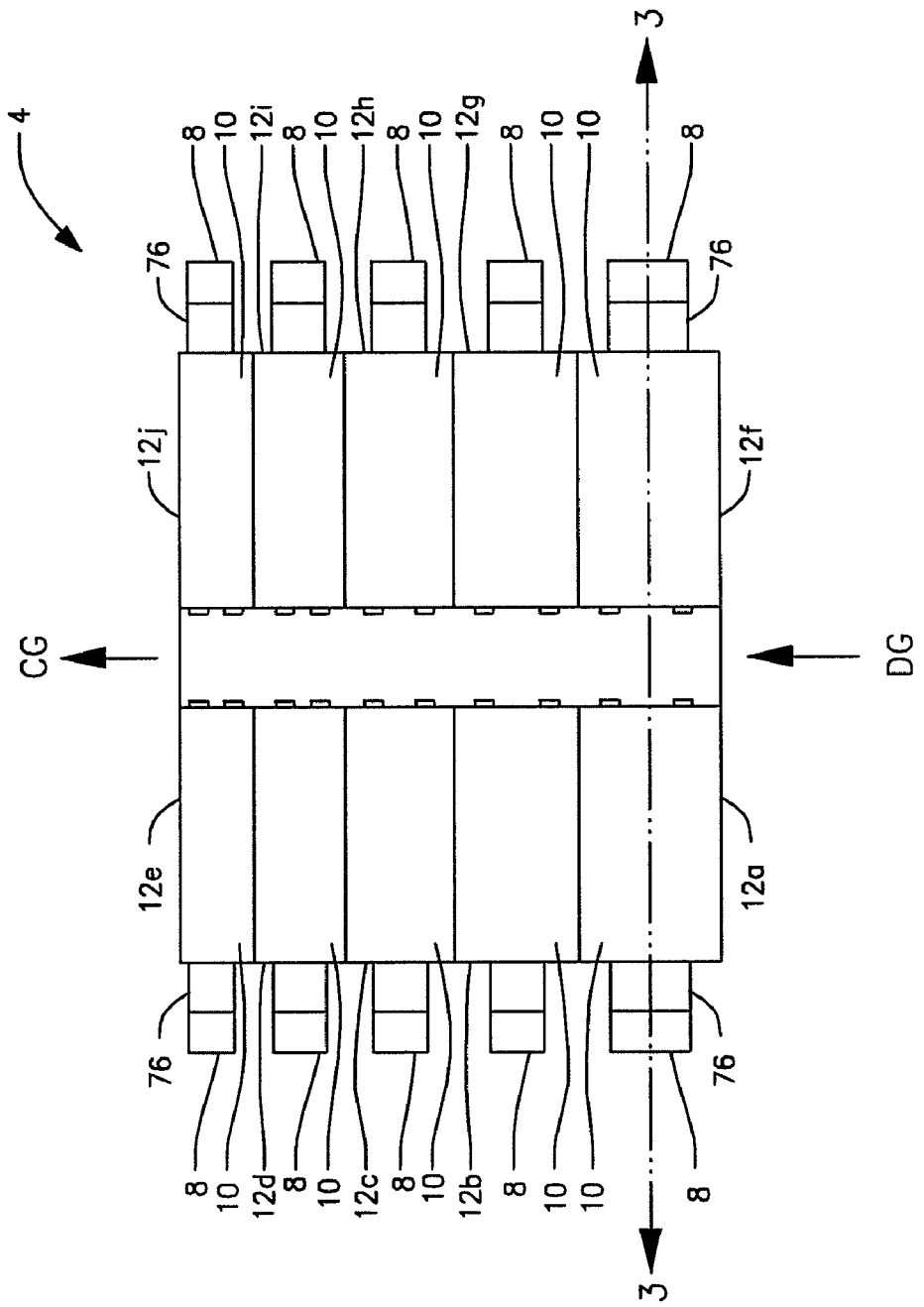
FIG. 2 is a top view of one embodiment of the air quality control system of the present invention.

As best illustrated in FIG. 2, one embodiment of the present AQCS 4 comprises a plurality of integrated dry scrubber systems 8 and fabric filter modules 10, referred to hereinafter as integrated components 12. In general, dry scrubber system 8 comprises lime hydration chamber 14, dry scrubber mixer 16, dry scrubber reactor 18 and dry scrubber reaction vessel 20. Fabric filter module 10 comprises particulate/contaminant chamber 22, a plurality of fabric filter bags 24, chamber barrier 26 and particulate/contaminant collection bin 28. AQCS 4 is configured to include a common inlet plenum 30 with inlet plenum opening 32. Common inlet plenum 30 is common to and fluidly connected to each integrated component 12. AQCS 4 is also configured to include a common outlet plenum 34 with outlet plenum opening 36. Common outlet plenum 34 is common to and fluidly connected to each integrated component 12. Common inlet plenum 30 and common outlet plenum 34 are preferably aligned substantially parallel to each other with common inlet plenum 30 located along a plane, P1, below and parallel plane, P2, on which common outlet plenum 34 is located. Inlet plenum opening 32 and outlet plenum opening 36 may both be located on side 4a of AQCS 4, or alternatively may be located on opposed sides 4a and 4b of AQCS 4.

At least two, but more preferably a plurality of integrated components 12 are individually, fluidly attached to common inlet plenum 30 by means of individual inlet plenums 38 each having an inlet opening 40. As illustrated in FIG. 2, a total of ten integrated components 12 (12a, 12b, 12c, 12d, 12e, 12f, 12g, 12h, 12i and 12j) are individually, fluidly attached via individual inlet openings 40 (40a, 40b, 40c, 40d, 40e, 40f, 40g, 40h, 40i and 40j, respectively) to opposed, parallel, elongated sides 42 and 44 of common inlet plenum 30. More particularly, five integrated components 12 (12a, 12b, 12c, 12d and 12e) are fluidly attached to elongated side 42 of common inlet plenum 30, while five other integrated components 12 (12f, 12g, 12h, 12i and 12j) are fluidly attached to elongated side 44 of common inlet plenum 30. Of course, it will be recognized that a greater or a lesser number of integrated components 12 may be fluidly attached to an appropriately sized common inlet plenum 30 and still be within the scope and spirit of the present invention.

As further illustrated in FIG. 2, a total of ten integrated components 12 (12a, 12b, 12c, 12d, 12e, 12f, 12g, 12h, 12i and 12j) are individually, fluidly attached via individual outlet openings 46 (46a, 46b, 46c, 46d, 46e, 46f, 46g, 46h, 46i and 46j, respectively) to opposed, parallel, elongated sides 48 and 50 of common outlet plenum 34. More particularly, five integrated components 12 (12a, 12b, 12c, 12d and 12e) are fluidly attached to elongated side 48 of common outlet plenum 34, while five other integrated components 12 (12f, 12g, 12h, 12i and 12j) are fluidly attached to elongated side 50 of common outlet plenum 34. Of course, it will be recognized that a greater or a lesser number of integrated components 12 may be fluidly attached to an appropriately sized common outlet plenum 34 and still be within the scope and spirit of the present invention.

As best illustrated in FIG. 2, integrated components 12 are arranged in pairs on opposed elongated sides 42 and 44 of common inlet plenum 30 and on opposed elongated sides 48 and 50 of common outlet plenum 34. Hence, integrated components 12a and 12f are a pair, 12b and 12g are a pair, 12c and 12h are a pair, 12d and 12i are a pair and 12e and 12j are a pair. As illustrated, multiple pairs of integrated components 12 are arranged side-by-side along appropriately sized common inlet plenum 30 and common outlet plenum 34. Such an arrangement allows for relative ease in the addition of additional integrated components 12 for purposes of meeting boiler 2 capacity increases and/or increasing AQCS efficiency and/or effectiveness.

Each inlet opening 40 as described above, is equipped with an individually controlled mobile inlet isolation damper 52. Likewise, each outlet opening 46 is equipped with an individually controlled mobile outlet isolation damper 54. The individually controlled inlet isolation dampers 52 and outlet isolation dampers 54 may be individually opened and closed to allow for individual component 12 cleaning/repair, maintenance, turn down and the like as explained in more detail below.

Figure 3:
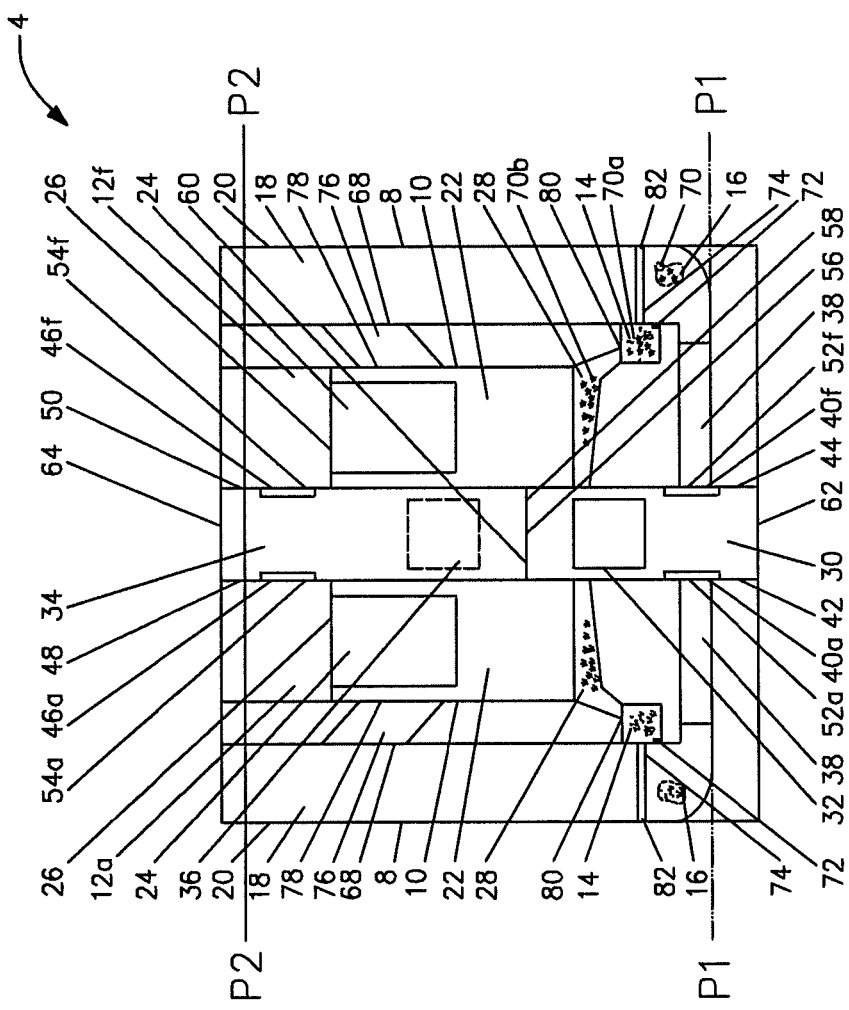
FIG. 3 is a side view of the air quality control system of FIG. 2 taken along line 3-3.

FIG. 3 illustrates a cross section of the AQCS of FIG. 2 taken along line 3-3. In plane P1 denoted by line P1-P1 is common inlet plenum 30. In plane P2 denoted by line P2-P2 is common outlet plenum 34. Common inlet plenum 30 and common outlet plenum 34 are fluidly separated by barrier 56. Barrier 56 is attached between elongated sides 42 and 44 of common inlet plenum 30 so as to form top side 58 and attached between elongated sides 48 and 50 of common outlet plenum 34 so as to form base side 60. Spaced apart from and parallel to top side 58 of common inlet plenum 30 is inlet base wall 62. Inlet base wall 62 is attached between elongated sides 42 and 44 opposite top side 58. Spaced apart from and parallel to base side 60 of common outlet plenum 34 is outlet top wall 64. Outlet top wall 64 is attached between elongated sides 48 and 50 opposite base side 60.

In elongated sides 42 and 44 of common inlet plenum 30 are inlet openings 40 (40a and 40f) for integrated components 12 (12a and 12f, respectively), as was described in greater detail previously. Inlet openings 40 are fluidly connected to opposed common inlet plenum 30 and fabric filter duct 66. By means of fabric filter duct 66, common inlet plenum 30 and dry scrubber system 8 are fluidly connected. Dry scrubber system 8 comprises an absorption material 70b, typically lime, supplied within hydration chamber 14. The hydration chamber 14 is fluidly connected to a solvent or water source (not shown), an absorption material or lime source (not shown) and optionally a recycled material source, i.e., the collection bin 28 of fabric filter module 10, as described in more detail below. The hydration chamber 14 is fluidly connected to dry scrubber mixer 16. Fluidly connected to dry scrubber mixer 16 is dry scrubber reactor 18 housed within dry scrubber reaction vessel 20. Dry scrubber reaction vessel 20 is equipped with scrubber opening 68 to which fabric filter module 10 is fluidly connected.

Hydration chamber 14 is generally a chamber of any commercially useful configuration. Within hydration chamber 14, an absorption material 70a such as lime from an absorption material source and optionally a recycled material 70b such as recycled lime from collection bin 28 are combined to form reaction material 70. As needed for efficient operation of dry scrubber reactor 18, reaction material 70 is mechanically and/or gravity fed into dry scrubber mixer 16 via mixer opening 72. Mixer opening 72 fluidly connects hydration chamber 14 and dry scrubber mixer 16. Prior to the fed reaction material 70 passing through mixer opening 72 and into dry scrubber mixer 16, reaction material 70 is sprayed with a predetermined amount of a solvent such as water from a solvent source so as to hydrate reaction material 70.

Dry scrubber mixer 16 is generally a mixer of any commercially useful configuration. Within dry scrubber mixer 16, hydrated reaction material 70 is mixed for approximately 15 to 20 seconds to achieve a moisture content throughout of approximately 5%. Once the reaction material 70 is thoroughly mixed within dry scrubber mixer 16 to achieve the desired moisture content throughout reaction material 70, reaction material 70 is mechanically and/or gravity fed out of dry scrubber mixer 16 and into dry scrubber reaction vessel 20 through exit opening 74. Exit opening 74 fluidly connects dry scrubber mixer 16 and dry scrubber reaction vessel 20.

As noted previously, dry scrubber reaction vessel 20 houses dry scrubber reactor 18. Dry scrubber reactor 18 is that portion of dry scrubber reaction vessel 20 where reaction material 70 enters dry scrubber reaction vessel 20 passing through exit opening 74 to be dispersed from dispersal ring or plate 82. Dispersal ring or plate 82 is located within dry scrubber reactor 18 and disperses reaction material 70 therein by mechanical means (not shown). It is in dry scrubber reactor 18 where reaction material 70 contacts, commingles and reacts with dirty flue gas, DG, laden with, for example, vapor phase $SO_2$, $SO_3$, HCl and/or HF, particulates and/or like acidic contaminants. Thus, it is within dry scrubber reactor 18 where one or more of the following exemplificative reaction(s) occur to form dry particulates, DP.

$SO_2$: $SO_2 + Ca(OH)_2 = CaSO_3 + H_2O$ $SO_3$: $SO_3 + Ca(OH)_2 = CaSO_4 + H_2O$

HCl: $2HCl + Ca(OH)_2 = CaCl_2 + H_2O$

HF: $2HF + Ca(OH)_2 = CaF_2 + H_2O$

Such reactions and those like them are known to those skilled in the art. The DG continues through dry scrubber reaction vessel 20 and into fluidly connected fabric filter inlet 76 by means of inlet opening 78. As DG flows into fabric filter inlet 76, it carries with it DP and like particulates. From fabric filter inlet 76, DG flows into the fluidly connected particulate chamber 22. Within particulate chamber 22, a plurality of fabric filter bags 24 is supported by chamber barrier 26. Hence, DG flows into particulate chamber 22, passes through fabric filter bags 24 whereupon DP and like particulates are blocked by fabric filter bags 24, thus allowing only "clean" flue gas, CG, to pass beyond chamber barrier 26. After passing chamber barrier 26, CG exits fabric filter module 10 by means of outlet opening 46 to enter fluidly connected common outlet plenum 34. CG passes from each integrated component 12 into fluidly connected common outlet plenum 34 prior to exiting AQCS 4 through single outlet plenum opening 36.

DP and like particulates blocked by fabric filter bags 24 fall into or are collected upon fabric filter 24 cleaning in collection bin 28 located beneath fabric filter bags 24 in the bottom of particulate chamber 22. Collection bin 28 is fluidly connected to hydration chamber 14. DP and like particulates, i.e., recycled material 70b, are mechanically fed and/or gravity fed through exit portal 80 of collection bin 28 and into hydration chamber 14. Within hydration chamber 14, recycled material 70b from collection bin 28 and absorption material 70a are combined to form reaction material 70, as described above.

An exemplary method of using AQCS 4 as described in detail above to at least partially remove vapor phase acidic contaminants and to at least partially remove particulate contaminants from DG is now provided. The subject method comprises passing DG through inlet plenum opening 32, into common inlet plenum 30, through inlet opening 40 and into dry scrubber reaction vessel 20. Within dry scrubber reaction vessel 20, DG contacts reaction material 70 in dry scrubber reactor 18 and reacts therewith to at least partially remove vapor phase acidic contaminants within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet opening 46, into common outlet plenum 34 and out of AQCS 4 through outlet plenum opening 36. The subject method has a vapor phase contaminant removal efficacy of approximately 99 percent.

Another exemplificative method of using AQCS 4 as described in detail above to at least partially remove vapor phase acidic contaminants and to at least partially remove particulate contaminants from DG is now provided. The subject method comprises passing DG through inlet plenum opening 32, into common inlet plenum 30, through inlet openings 40 with open, non-blocking inlet isolation dampers 52 (nine of the ten inlet isolation dampers 52 open—one closed, e.g., 52j), and into dry scrubber reaction vessel 20. Within dry scrubber reaction vessel 20, DG contacts reaction material 70 in dry scrubber reactor 18 and reacts therewith to at least partially remove vapor phase acidic contaminants within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (nine of the ten outlet isolation dampers 54 open—one closed, e.g., 54j), into common outlet plenum 34 and out of AQCS 4 through outlet plenum opening 36. The subject method has an AQCS 4 turn down to approximately 90 percent of full capacity.

Another exemplificative method of using AQCS 4 as described in detail above to at least partially remove vapor phase acidic contaminants and to at least partially remove particulate contaminants from DG is now provided. The subject method comprises passing DG through inlet plenum opening 32, into common inlet plenum 30, through inlet openings 40 with open, non-blocking inlet isolation dampers 52 (four of the ten inlet isolation dampers 52 open—six closed, e.g., 52j, 52e, 52i, 52d, 52h and 52c), and into dry scrubber reaction vessel 20. Within dry scrubber reaction vessel 20, DG contacts reaction material 70 in dry scrubber reactor 18 and reacts therewith to at least partially remove vapor phase acidic contaminants within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (four of the ten outlet isolation dampers 54 open—six closed, e.g., 54j, 54e, 54i, 54d, 54h and 54c), into common outlet plenum 34 and out of AQCS 4 through outlet plenum opening 36. The subject method has an AQCS 4 turn down to approximately 40 percent of full capacity.

Another exemplificative method of using AQCS 4 as described in detail above to at least partially remove vapor phase acidic contaminants and to at least partially remove particulate contaminants from DG is now provided. The subject method comprises passing DG through inlet plenum opening 32, into common inlet plenum 30, through inlet openings 40 with open, non-blocking inlet isolation dampers 52 (three of the ten inlet isolation dampers 52 open—seven closed, e.g., 52*j*, 52*e*, 52*i*, 52*d*, 52*h*, 52*c* and 52*g*), and into dry scrubber reaction vessel 20. Within dry scrubber reaction vessel 20, DG contacts reaction material 70 in dry scrubber reactor 18 and reacts therewith to at least partially remove vapor phase acidic contaminants within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (three of the ten outlet isolation dampers 54 open—seven closed, e.g., 54*j*, 54*e*, 54*i*, 54*d*, 54*h*, 54*c* and 54*g*), into common outlet plenum 34 and out of AQCS 4 through outlet plenum opening 36. The subject method has an AQCS 4 turn down to approximately 30 percent of full capacity.

Another exemplicative method of using AQCS 4 as described in detail above to at least partially remove vapor phase acidic contaminants and to at least partially remove particulate contaminants from DG is now provided. The subject method comprises passing DG through inlet plenum opening 32, into common inlet plenum 30, through inlet openings 40 with open, non-blocking inlet isolation dampers 52 (two of the ten inlet isolation dampers 52 open—eight closed, e.g., 52*j*, 52*e*, 52*i*, 52*d*, 52*h*, 52*c*, 52*g* and 52*b*), and into dry scrubber reaction vessel 20. Within dry scrubber reaction vessel 20, DG contacts reaction material 70 in dry scrubber reactor 18 and reacts therewith to at least partially remove vapor phase acidic contaminants within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (two of the ten outlet isolation dampers 54 open—eight closed, e.g., 54*j*, 54*e*, 54*i*, 54*d*, 54*h*, 54*c*, 54*g* and 54*b*), into common outlet plenum 34 and out of AQCS 4 through outlet plenum opening 36. The subject method has an AQCS 4 turn down to approximately 20 percent of full capacity.

Another exemplicative method of using AQCS 4 as described in detail above to at least partially remove vapor phase acidic contaminants and to at least partially remove particulate contaminants from DG is now provided. The subject method comprises passing DG through inlet plenum opening 32, into common inlet plenum 30, through inlet openings 40 with open, non-blocking inlet isolation dampers 52 (one of the ten inlet isolation dampers 52 open—nine closed, e.g., 52*j*, 52*e*, 52*i*, 52*d*, 52*h*, 52*c*, 52*g*, 52*b* and 52*f*), and into dry scrubber reaction vessel 20. Within dry scrubber reaction vessel 20, DG contacts reaction material 70 in dry scrubber reactor 18 and reacts therewith to at least partially remove vapor phase acidic contaminants within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (one of the ten outlet isolation dampers 54 open—nine closed, e.g., 54*j*, 54*e*, 54*i*, 54*d*, 54*h*, 54*c*, 54*g*, 54*b* and 54*f*, into common outlet plenum 34 and out of AQCS 4 through outlet plenum opening 36. The subject method has an AQCS 4 turn down to approximately 10 percent of full capacity.

An exemplicative method of using AQCS 4 as described in detail above to at least partially remove vapor phase $SO_2$ and to at least partially remove particulate contaminants from DG is now provided. The subject method comprises passing DG through inlet plenum opening 32, into common inlet plenum 30, through inlet opening 40 and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$ within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet opening 46, into common outlet plenum 34 and out of AQCS 4 through outlet plenum opening 36. The subject method has $SO_2$ removal efficacy of approximately 99 percent.

Another exemplicative method of using AQCS 4 as described in detail above to at least partially remove vapor phase $SO_2$ and to at least partially remove particulate contaminants from DG is now provided. The subject method comprises passing DG through inlet plenum opening 32, into common inlet plenum 30, through inlet openings 40 with open, non-blocking inlet isolation dampers 52 (nine of the ten inlet isolation dampers 52 open—one closed, e.g., 52*j*), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$ within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (nine of the ten outlet isolation dampers 54 open—one closed, e.g., 54*j*), into common outlet plenum 34 and out of AQCS 4 through outlet plenum opening 36. The subject method has an AQCS 4 turn down to approximately 90 percent of full capacity.

Another exemplicative method of using AQCS 4 as described in detail above to at least partially remove vapor phase $SO_2$ and to at least partially remove particulate contaminants from DG is now provided. The subject method comprises passing DG through inlet plenum opening 32, into common inlet plenum 30, through inlet openings 40 with open, non-blocking inlet isolation dampers 52 (four of the ten inlet isolation dampers 52 open—six closed, e.g., 52*j*, 52*e*, 52*i*, 52*d*, 52*h* and 52*c*), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$ within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (four of the ten outlet isolation dampers 54 open—six closed, e.g., 54*j*, 54*e*, 54*i*, 54*d*, 54*h* and 54*c*), into common outlet plenum 34 and out of AQCS 4 through outlet plenum opening 36. The subject method has an AQCS 4 turn down to approximately 40 percent of full capacity.

Another exemplicative method of using AQCS 4 as described in detail above to at least partially remove vapor phase $SO_2$ and to at least partially remove particulate contaminants from DG is now provided. The subject method comprises passing DG through inlet plenum opening 32, into common inlet plenum 30, through inlet openings 40 with open, non-blocking inlet isolation dampers 52 (three of the ten inlet isolation dampers 52 open—seven closed, e.g., 52j, 52e, 52i, 52d, 52h, 52c and 52g), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$ within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (three of the ten outlet isolation dampers 54 open—seven closed, e.g., 54j, 54e, 54i, 54d, 54h, 54c and 54g), into common outlet plenum 34 and out of AQCS 4 through outlet plenum opening 36. The subject method has an AQCS 4 turn down to approximately 30 percent of full capacity.

Another exemplicative method of using AQCS 4 as described in detail above to at least partially remove vapor phase $SO_2$ and to at least partially remove particulate contaminants from DG is now provided. The subject method comprises passing DG through inlet plenum opening 32, into common inlet plenum 30, through inlet openings 40 with open, non-blocking inlet isolation dampers 52 (two of the ten inlet isolation dampers 52 open—eight closed, e.g., 52j, 52e, 52i, 52d, 52h, 52c, 52g and 52b), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$ within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (two of the ten outlet isolation dampers 54 open—eight closed, e.g., 54j, 54e, 54i, 54d, 54h, 54c, 54g and 54b), into common outlet plenum 34 and out of AQCS 4 through outlet plenum opening 36. The subject method has an AQCS 4 turn down to approximately 20 percent of full capacity.

Another exemplicative method of using AQCS 4 as described in detail above to at least partially remove vapor phase $SO_2$ and to at least partially remove particulate contaminants from DG is now provided. The subject method comprises passing DG through inlet plenum opening 32, into common inlet plenum 30, through inlet openings 40 with open, non-blocking inlet isolation dampers 52 (one of the ten inlet isolation dampers 52 open—nine closed, e.g., 52j, 52e, 52i, 52d, 52h, 52c, 52g, 52b and 52f), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$ within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (one of the ten outlet isolation dampers 54 open—nine closed, e.g., 54j, 54e, 54i, 54d, 54h, 54c, 54g, 54b and 54f), into common outlet plenum 34 and out of AQCS 4 through outlet plenum opening 36. The subject method has an AQCS 4 turn down to approximately 10 percent of full capacity.

An exemplicative method of using AQCS 4 as described in detail above to at least partially remove vapor phase $SO_2$, $SO_3$, HCl and/or HF and to at least partially remove particulate contaminants from DG is now provided. The subject method comprises passing DG through inlet plenum opening 32, into common inlet plenum 30, through inlet opening 40 and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$, $SO_3$, HCl and/or HF within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet opening 46, into common outlet plenum 34 and out of AQCS 4 through outlet plenum opening 36. The subject method has $SO_2$, $SO_3$, HCl and/or HF removal efficacy of approximately 99 percent.

Another exemplicative method of using AQCS 4 as described in detail above to at least partially remove vapor phase $SO_2$, $SO_3$, HCl and/or HF and to at least partially remove particulate contaminants from DG is now provided. The subject method comprises passing DG through inlet plenum opening 32, into common inlet plenum 30, through inlet openings 40 with open, non-blocking inlet isolation dampers 52 (nine of the ten inlet isolation dampers 52 open—one closed, e.g., 52j), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$, $SO_3$, HCl and/or HF within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (nine of the ten outlet isolation dampers 54 open—one closed, e.g., 54j), into common outlet plenum 34 and out of AQCS 4 through outlet plenum opening 36. The subject method has a AQCS 4 turn down to approximately 90 percent of full capacity.

Another exemplicative method of using AQCS 4 as described in detail above to at least partially remove vapor phase $SO_2$, $SO_3$, HCl and/or HF and to at least partially remove particulate contaminants from DG is now provided. The subject method comprises passing DG through inlet plenum opening 32, into common inlet plenum 30, through inlet openings 40 with open, non-blocking inlet isolation dampers 52 (four of the ten inlet isolation dampers 52 open—six closed, e.g., 52j, 52e, 52i, 52d, 52h and 52c), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$, $SO_3$, HCl and/or HF within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (four of the ten outlet isolation dampers 54 open—six closed, e.g., 54j, 54e, 54i, 54d, 54h and 54c), into common outlet plenum 34 and out of AQCS 4 through outlet plenum opening 36. The subject method has an AQCS 4 turn down to approximately 40 percent of full capacity.

Another exemplificative method of using AQCS 4 as described in detail above to at least partially remove vapor phase $SO_2$, $SO_3$, HCl and/or HF and to at least partially remove particulate contaminants from DG is now provided. The subject method comprises passing DG through inlet plenum opening 32, into common inlet plenum 30, through inlet openings 40 with open, non-blocking inlet isolation dampers 52 (three of the ten inlet isolation dampers 52 open—seven closed, e.g., 52j, 52e, 52i, 52d, 52h, 52c and 52g), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$, $SO_3$, HCl and/or HF within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (three of the ten outlet isolation dampers 54 open—seven closed, e.g., 54j, 54e, 54i, 54d, 54h, 54c and 54g), into common outlet plenum 34 and out of AQCS 4 through outlet plenum opening 36. The subject method has an AQCS 4 turn down to approximately 30 percent of full capacity.

Another exemplificative method of using AQCS 4 as described in detail above to at least partially remove vapor phase $SO_2$, $SO_3$, HCl and/or HF and to at least partially remove particulate contaminants from DG is now provided. The subject method comprises passing DG through inlet plenum opening 32, into common inlet plenum 30, through inlet openings 40 with open, non-blocking inlet isolation dampers 52 (two of the ten inlet isolation dampers 52 open—eight closed, e.g., 52j, 52e, 52i, 52d, 52h, 52c, 52g and 52b), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$, $SO_3$, HCl and/or HF within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (two of the ten outlet isolation dampers 54 open—eight closed, e.g., 54j, 54e, 54i, 54d, 54h, 54c, 54g and 54b), into common outlet plenum 34 and out of AQCS 4 through outlet plenum opening 36. The subject method has an AQCS 4 turn down to approximately 20 percent of full capacity.

Still another exemplificative method of using AQCS 4 as described in detail above to at least partially remove vapor phase $SO_2$, $SO_3$, HCl and/or HF and to at least partially remove particulate contaminants from DG is now provided. The subject method comprises passing DG through inlet plenum opening 32, into common inlet plenum 30, through inlet openings 40 with open, non-blocking inlet isolation dampers 52 (one of the ten inlet isolation dampers 52 open—nine closed, e.g., 52j, 52e, 52i, 52d, 52h, 52c, 52g, 52b and 52f), and into dry scrubber reaction vessel 20. Within dry scrubber reaction vessel 20, DG contacts hydrated lime reaction material 70 in dry scrubber reactor 18 and reacts therewith to at least partially remove vapor phase $SO_2$, $SO_3$, HCl and/or HF within DG prior to passage through inlet opening 78 and fabric filter inlet 76. DG then passes from fabric filter inlet 76 into particulate chamber 22 to be filtered by fabric filter bags 24 to at least partially remove particulate contaminants within DG prior to flowing beyond chamber barrier 26 as CG. CG then passes through outlet openings 46 with open, non-blocking outlet isolation dampers 54 (one of the ten outlet isolation dampers 54 open—nine closed, e.g., 54j, 54e, 54i, 54d, 54h, 54c, 54g, 54b and 54f), into common outlet plenum 34 and out of AQCS 4 through outlet plenum opening 36. The subject method has an AQCS 4 turn down to approximately 10 percent of full capacity.

Various embodiments of the present invention have been described herein. The descriptions are intended to be illustrative of the present invention. It will be apparent to one of skill in the art that modifications may be made to the invention as described without departing from the scope of the claims set forth below. For example, it is to be understood that although some of the embodiments of the present invention have been described in the context of an AQCS of a particular arrangement, it should be appreciated that other arrangements may be used without deviation from the spirit and scope of the claims below.

What is claimed:

1. An air quality control system comprising a plurality of integrated components useful for at least partially removing vapor and particulate contaminants from a flue gas, wherein each integrated component comprises: in a single component an inlet opening; a dry scrubber reactor; a fabric filter; and an outlet opening; wherein said integrated components are each fluidly connected to a common inlet plenum and a common outlet plenum.

2. An air quality control system in accordance with claim 1 wherein said common inlet plenum and said common outlet plenum are in parallel alignment.

3. An air quality control system in accordance with claim 2 wherein said common inlet plenum is in a plane below that of said common outlet plenum.

4. The integrated component of claim 1 further comprising a collection bin for collecting particulates removed from a flue gas stream by said fabric filter.

5. The integrated component of claim 1 further comprising a mobile inlet isolation damper for controlling fluid flow through an inlet opening and a mobile outlet isolation damper for controlling fluid flow through an outlet opening.

6. The integrated component of claim 5 wherein said mobile inlet isolation damper is in an open, non-blocking position to allow fluid flow through said inlet opening and said mobile outlet isolation damper is in an open, non-blocking position to allow fluid flow through said outlet opening.

7. The integrated component of claim 5 wherein said mobile inlet isolation damper is in a closed, blocking position to block fluid flow through said inlet opening and said mobile outlet isolation damper is in a closed, blocking position to block fluid flow through said outlet opening.

8. A method of using the air quality control system of claim 1 to at least partially remove vapor and particulate contaminants from a flue gas comprising: a.) passing said flue gas laden with acidic contaminants though an inlet opening and into a dry scrubber reactor; b.) reacting said flue gas with a reaction material in said dry scrubber reactor to form dry particulates; and c.) removing said dry particulates from said flue gas using a fabric filter prior to said flue gas passage through an outlet opening.

9. A method of using the air quality control system of claim 1 to at least partially remove vapor and particulate contaminants from a flue gas comprising: a.) passing a flue gas laden with acidic contaminants through said common inlet plenum, into said inlet opening of each integrated component and into said dry scrubber reactors; b.) reacting said flue gas with a reaction material in said dry scrubber reactors to form dry particulates; and c.) removing said dry particulates from said flue gas using said fabric filters prior to said flue gas passage through said outlet opening of each integrated component and through said common outlet plenum.

10. A method of using the air quality control system of claim 1 to at least partially remove vapor and particulate contaminants from a flue gas comprising: a.) passing a flue gas laden with acidic contaminants through said common inlet plenum, into said inlet opening of each integrated component that has a mobile inlet isolation damper in an open, non-blocking position and into said corresponding dry scrubber reactors; b.) reacting said flue gas with a reaction material in said dry scrubber reactors to form dry particulates; and c.) removing said dry particulates from said flue gas using said fabric filters prior to said flue gas passage through said outlet opening of each integrated component with a mobile inlet isolation damper in an open, non-blocking position and through said common outlet plenum.

11. The method of claim 10 wherein at least one inlet isolation damper is in a closed, blocking position and at least one corresponding outlet isolation damper is in a closed, blocking position to allow for maintenance or air quality control system turn down.

12. The method of claim 11 wherein an air quality control system turn down to 10 percent of capacity is achieved.

13. The method of claim 11 wherein an air quality control system turn down to 20 percent of capacity is achieved.

14. The method of claim 11 wherein an air quality control system turn down to 30 percent of capacity is achieved.

15. The method of claim 11 wherein an air quality control system turn down to 40 percent of capacity is achieved.

16. An air quality control system comprising a plurality of integrated components useful for at least partially removing vapor phase $SO_2$ and particulate contaminants from a flue gas, wherein each integrated component comprises: in a single integrated component, an inlet opening; a dry scrubber reactor with dispersed hydrated lime; a fabric filter; and an outlet opening; wherein said integrated components are each fluidly connected to a common inlet plenum and a common outlet plenum.

17. A method of using the air quality control system of claim 16 to at least partially remove vapor phase $SO_2$ and particulate contaminants from a flue gas comprising: a.) passing said flue gas laden with vapor phase $SO_2$ through said common inlet plenum, into said inlet opening of each integrated component that has a mobile inlet isolation damper in an open, non-blocking position and into said corresponding dry scrubber reactors; b.) reacting said flue gas with a hydrated lime reaction material in said dry scrubber reactors to form dry particulates; and c.) removing said dry particulates from said flue gas using said fabric filters prior to said flue gas passage through said outlet opening of each integrated component with a mobile inlet isolation damper in an open, non-blocking position and through said common outlet plenum.

* * * * *